(12) United States Patent
Torii et al.

(10) Patent No.: US 11,389,949 B2
(45) Date of Patent: Jul. 19, 2022

(54) CONTROL DEVICE, CONTROL METHOD, AND CONTROL SYSTEM

(71) Applicant: SONY CORPORATION, Tokyo (JP)

(72) Inventors: Kuniaki Torii, Kanagawa (JP); Naoyuki Sato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 179 days.

(21) Appl. No.: 16/645,652

(22) PCT Filed: Jun. 28, 2018

(86) PCT No.: PCT/JP2018/024600
§ 371 (c)(1),
(2) Date: Mar. 9, 2020

(87) PCT Pub. No.: WO2019/058694
PCT Pub. Date: Mar. 28, 2019

(65) Prior Publication Data
US 2020/0282549 A1 Sep. 10, 2020

(30) Foreign Application Priority Data
Sep. 20, 2017 (JP) .............................. JP2017-180085

(51) Int. Cl.
*B25J 9/16* (2006.01)
*B25J 9/00* (2006.01)
*B25J 13/00* (2006.01)

(52) U.S. Cl.
CPC .......... *B25J 9/0084* (2013.01); *B25J 9/1661* (2013.01); *B25J 9/1682* (2013.01); *B25J 13/006* (2013.01)

(58) Field of Classification Search
CPC ........ B25J 9/0084; B25J 9/1669; B25J 9/163; B25J 9/1653; B25J 9/1682; B25J 9/1661; B25J 13/006; G06F 16/3344; G05B 13/028
USPC ..... 700/33, 245, 248; 318/587, 628, 568.11; 901/1, 9; 705/7.38, 7.39
See application file for complete search history.

(56) References Cited

U.S. PATENT DOCUMENTS

| | | | |
|---|---|---|---|
| 2012/0180064 A1* | 7/2012 | Helander | G06F 9/4881 718/104 |
| 2014/0351819 A1* | 11/2014 | Shah | G06F 9/4881 718/103 |
| 2020/0061839 A1* | 2/2020 | Deyle | B25J 9/1664 |

FOREIGN PATENT DOCUMENTS

| | | |
|---|---|---|
| JP | 2003-291083 A | 10/2003 |
| JP | 2005-078456 A | 3/2005 |
| JP | 2005-262378 A | 9/2005 |

(Continued)

*Primary Examiner* — Dalena Tran
(74) *Attorney, Agent, or Firm* — Paratus Law Group, PLLC

(57) ABSTRACT

There is provided a control device, a control method, and a control system that implement a robot that flexibly executes a task in cooperation with another robot, the control device including: an ability management unit that determines capability indicating ability that can be executed by a first robot at predetermined timing as of that timing; a help management unit that compares ability required for a task to be executed by the first robot with the capability of the first robot and generates a help list indicating ability required for execution of the task; and a cooperation management unit that instructs a second robot having the capability that satisfies the ability indicated in the help list to execute the task in cooperation with the first robot.

19 Claims, 14 Drawing Sheets

(56) References Cited

FOREIGN PATENT DOCUMENTS

| | | |
|---|---|---|
| JP | 2006-239849 A | 9/2006 |
| JP | 2006-263836 A | 10/2006 |
| JP | 2007-245317 A | 9/2007 |
| JP | 2008-003807 A | 1/2008 |
| JP | 2009-018409 A | 1/2009 |
| JP | 2009-136932 A | 6/2009 |
| WO | WO 2017/121456 A1 | 7/2017 |

* cited by examiner

FIG. 3

| CATEGORY | FUNCTION | ATTRIBUTE | POSSIBLE START TIME | SECURED ABILITY DURATION |
|---|---|---|---|---|
| MOBILITY | HIGHEST POSSIBLE SPEED OF TRAVELLING | 0.5m/s | 30 SECONDS LATER | 30 MINUTES |
| | LOWEST POSSIBLE SPEED OF TRAVELLING | 0.1m/s | 30 SECONDS LATER | 50 MINUTES |
| | POSSIBLE TRAVEL DISTANCE | 200m | 30 SECONDS LATER | 30 MINUTES |
| | LEVEL DIFFERENCE THAT CAN BE STEPPED OVER | 20cm | 30 SECONDS LATER | 20 MINUTES |
| | TRAVELLING DIRECTION | FORWARD ONLY | — | — |
| | WIDTH THAT ALLOWS TRAVELLING | 15cm | — | — |
| MANIPULATION | WEIGHT THAT CAN BE LIFTED | 3kg | 10 SECONDS LATER | 10 MINUTES |
| | LOWEST POSSIBLE HEIGHT TO BE LIFTED TO | 10cm | 10 SECONDS LATER | — |
| | HIGHEST POSSIBLE HEIGHT TO BE LIFTED TO | 50cm | 10 SECONDS LATER | — |
| | SHAPE THAT ALLOWS LIFTING | Box | 10 SECONDS LATER | — |
| | SIZE THAT ALLOWS LIFTING | 30cm | 10 SECONDS LATER | — |
| KNOWLEDGE | MAP INFORMATION | 2F, 3F | Always | — |
| | LANGUAGE | JAPANESE AND ENGLISH | Always | — |

FIG. 4

| CATEGORY | FUNCTION | ATTRIBUTE | POSSIBLE START TIME | SECURED ABILITY DURATION |
|---|---|---|---|---|
| MOBILITY | POSSIBLE SPEED OF TRAVELLING | 0.3 TO 0.4m/s | 40 SECONDS LATER | 10 MINUTES |
| | POSSIBLE TRAVEL DISTANCE | 200m | 40 SECONDS LATER | 10 MINUTES |
| | LEVEL DIFFERENCE THAT CAN BE STEPPED OVER | No Request | — | — |
| | TRAVELLING DIRECTION | No Request | — | — |
| | WIDTH THAT ALLOWS TRAVELLING | No Request | — | — |
| MANIPULATION | WEIGHT THAT CAN BE LIFTED | 2kg | 40 SECONDS LATER | 3 MINUTES (UP TO 2F) |
| | POSSIBLE HEIGHT TO BE LIFTED TO | 20cm TO 30cm | 40 SECONDS LATER | 3 MINUTES (UP TO 2F) |
| | SHAPE THAT ALLOWS LIFTING | Box | 40 SECONDS LATER | — |
| | SIZE THAT ALLOWS LIFTING | 20cm | 40 SECONDS LATER | — |
| KNOWLEDGE | MAP INFORMATION | No Request | — | — |
| | LANGUAGE | No Request | — | — |

FIG. 5

| CATEGORY | FUNCTION | ATTRIBUTE | POSSIBLE START TIME | SECURED ABILITY DURATION |
|---|---|---|---|---|
| MOBILITY | POSSIBLE SPEED OF TRAVELLING | No Request | — | — |
| | POSSIBLE TRAVEL DISTANCE | No Request | — | — |
| | LEVEL DIFFERENCE THAT CAN BE STEPPED OVER | No Request | — | — |
| | TRAVELLING DIRECTION | No Request | — | — |
| | WIDTH THAT ALLOWS TRAVELLING | No Request | — | — |
| MANIPULATION | WEIGHT THAT CAN BE LIFTED | No Request | — | — |
| | POSSIBLE HEIGHT TO BE LIFTED TO | No Request | — | — |
| | SHAPE THAT ALLOWS LIFTING | No Request | — | — |
| | SIZE THAT ALLOWS LIFTING | No Request | — | — |
| KNOWLEDGE | MAP INFORMATION | 3F | 3 MINUTES | 5 MINUTES |
| | LANGUAGE | No Request | — | — |

| ITEM | VALUE (0 TO 100) |
|---|---|
| SIMILARITY | 90 |
| COMPLEMENTARITY | 50 |
| EVALUATION VALUE | 80 |

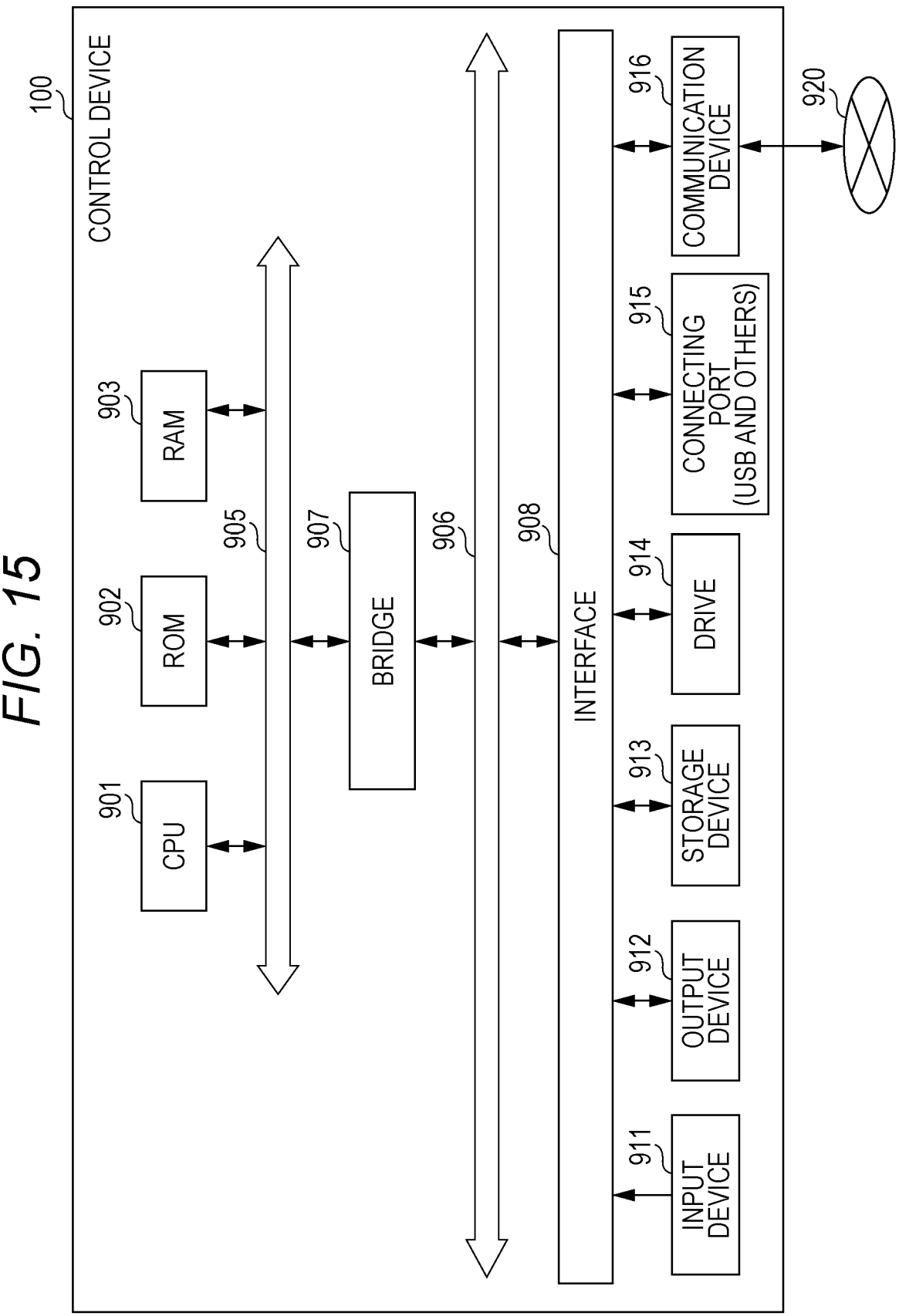

CONTROL DEVICE, CONTROL METHOD, AND CONTROL SYSTEM

CROSS REFERENCE TO PRIOR APPLICATION

This application is a National Stage Patent Application of PCT International Patent Application No. PCT/JP2018/024600 (filed on Jun. 28, 2018) under 35 U.S.C. § 371, which claims priority to Japanese Patent Application No. 2017-180085 (filed on Sep. 20, 2017), which are all hereby incorporated by reference in their entirety.

TECHNICAL FIELD

The present disclosure relates to a control device, a control method, and a control system.

BACKGROUND ART

In recent years, mechanical devices such as robots that perform motions resembling human motions using electrical or magnetic actions have become widespread. Specifically, in the industrial field, industrial robots such as manipulators or transfer robots that automate production operations are widely used. Meanwhile in the field of daily life, life-based support robots that support daily operations of users are used.

Especially recently, various types of robots have been provided. Robots of various types of travelling system such as a bipedal walking type, a quadrupedal walking type, or a tire type are provided. In these robots, there may be a difference in the ability that can be executed for each travelling system.

Patent Document 1 below discloses that an application program (also referred to as contents) that defines machine operation and structure control is provided depending on the type of a robot, a hardware configuration, or a platform.

CITATION LIST

Patent Document

Patent Document 1: Japanese Patent Application. Laid-Open No. 2005-78456

SUMMARY OF THE INVENTION

Problems to be Solved by the Invention

In the technology disclosed in Patent Document 1 described above, contents provided to a robot is controlled depending on static ability such as a hardware configuration or specifications of the robot. However, since the situation of the robot and the surrounding environment of the robot change at any time, the ability (also referred to as capability) that can be executed by the robot also changes at any time. For this reason, there is a demand for robots capable of flexibly attending to allocated work (also called a task) even in a case where the ability that can be executed by the robots dynamically changes.

Therefore, the present disclosure proposes a new and improved control device, a control method, and a control system that enable a robot to flexibly cooperate with another robot in order to execute an allocated task in an environment where the situation changes dynamically.

Solutions to Problems

According to the present disclosure, provided is a control device including: an ability management unit that determines capability indicating ability that can be executed by a first robot at predetermined timing as of that timing; a help management unit that compares ability required for a task to be executed by the first robot with the capability of the first robot and generates a help list indicating ability required for execution of the task; and a cooperation management unit that instructs a second robot having the capability that satisfies the ability indicated in the help list to execute the task in cooperation with the first robot.

The present disclosure also provides a control method, by an arithmetic processing device, including: determining capability indicating ability that can be executed by a first robot at predetermined timing as of that timing; comparing ability required for a task to be executed by the first robot with the capability of the first robot and generating a help list indicating ability required for execution of the task; and instructing a second robot having the capability that satisfies the ability indicated in the help list to execute the task in cooperation with the first robot.

The present disclosure further provides a control system including: an ability management unit that determines capability indicating ability that can be executed by a first robot at predetermined timing as of that timing; a help management unit that compares ability required for a task to be executed by the first robot with the capability of the first robot and generates a help list indicating ability required for execution of the task; and a cooperation management unit that instructs a second robot having the capability that satisfies the ability indicated in the help list to execute the task in cooperation with the first robot.

According to the present disclosure, it is possible to compare the capability of the first robot at predetermined timing with the ability required for execution of a task and to generate a help list indicating ability that is additionally required for execution of the task. As a result, the first robot can supplement the ability insufficient for execution of the task by cooperation with another robot.

Effects of the Invention

As described above, according to the present disclosure, it is possible to cause a robot to execute an allocated task flexibly by causing the robot to cooperate with another robot in an environment where the situation changes dynamically.

Note that the above effects are not necessarily limiting, and any one of effects described herein or other effects that can be grasped from this specification may be exerted together with the above effects or in place of the above effects.

BRIEF DESCRIPTION OF DRAWINGS

FIG. 5 is a table illustrating a specific example of capability determined by an ability management unit.

FIG. 4 is an exemplary table illustrating a specific example of a help list generated by a help management unit.

FIG. 5 is another exemplary table illustrating a specific example of a help list generated by the help management unit.

FIG. 15 is a block diagram illustrating an example of a hardware configuration of the control device according to the embodiment.

MODE FOR CARRYING OUT THE INVENTION

Preferred embodiments of the present disclosure will be described in detail below with reference to the accompanying drawings. Note that in the present specification and the drawings, components having substantially the same functional configuration are denoted by the same symbol, thereby omitting redundant explanation.

Figure 1:
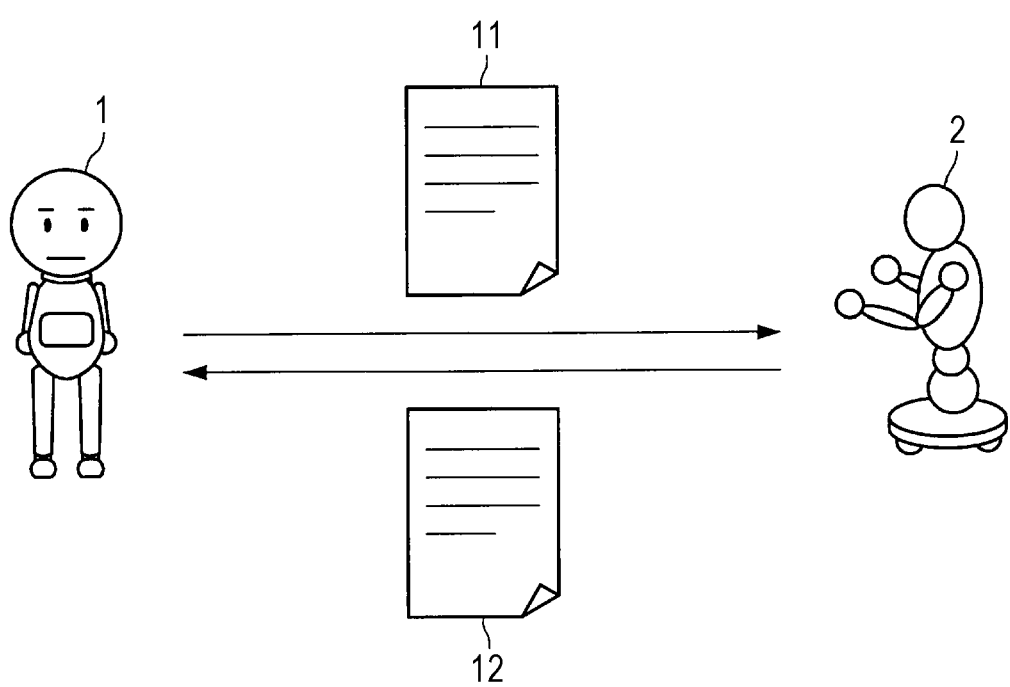
FIG. 1 is an explanatory diagram illustrating cooperation by a plurality of robots by a control device according to an embodiment of the present disclosure.

Note that explanation will be given in the following order.
1. Overview
2. Exemplary Configuration of Control Device
3. Exemplary Control
3.1. First Exemplary Control
3.2. Second Exemplary Control
3.3. Third Exemplary Control
3.4. Fourth Exemplary Control
3.5. Fifth. Exemplary Control
3.6. Sixth Exemplary Control
3.7. Seventh Exemplary Control
3.8. Eighth Exemplary Control
4. Exemplary Hardware Configuration
5. Summary 1. Overview First, an overview of a control device according to an embodiment of the present disclosure will be described with reference to FIG. 1. FIG. 1 is an explanatory diagram for explaining cooperation by a plurality of robots by the control device according to the present embodiment.

In the present embodiment, a robot may be a machine or a device that can control the movement of each unit using the action of at least one of electricity or magnetism. For example, a robot in the present embodiment may be a mobile or secured manipulation device, a humanoid autonomous control robot, a quadruped walking robot, an autonomous driving vehicle, a drone, an industrial robot (for example, an assembly robot such as a machine), a service robot (for example, a medical robot such as a surgical robot or a cooking robot), or a toy. However, the robots described below are not limited to the robots listed above, and may be any known robot. Moreover, each of the multiple robots that cooperate in the present embodiment may be the same type of robots or different types of robots.

As illustrated in FIG. 1, the control device according to the present embodiment causes multiple robots 1 and 2 to cooperate with each other to execute one piece of work (task).

Specifically, in a case where the robot 1 is allocated with a task exceeding the ability (capability) that can be executed by the robot 1, the control device determines that the allocated task cannot be handled by the robot 1 alone. Then, the control device generates a help list 11 indicating additionally required ability in addition to the ability of the robot 1 in order to execute the allocated task, and transmits the help list 11 to the robot. 2, for example.

The robot 2 that has received the help list 11 determines whether or not it is possible to supplement the ability that the robot 1 lacks to perform the task by comparing the received help list. 11 and the capability of the robot 2 itself. In a case where the robot 2 can supplement the ability that the robot 1 lacks to execute the task, the robot 2 returns a reply 12 to the robot 1 that a help can be provided.

Then, the control device causes the robots 1 and 2 to operate in cooperation with each other to cause the robots 1 and 2 to execute the task that cannot be executed by the robot 1 alone.

Here, the ability (capability) that can be executed respectively by the robots 1 and 2 may change dynamically. For example, the capability of the robots can change dynamically depending on whether or not the robots are performing another task, there is a failure in the robots, or the amount of electric power remaining in the batteries of the robots.

The control device according to the present embodiment generates a help list indicating the ability additionally required for execution of the task by comparing the ability required for execution of the task allocated to the robot 1 with the capability of the robot 1 that dynamically changes. As a result, in a case where a task is allocated to the robot 1, the control device according to the present embodiment can cause the robot 1 to execute the task flexibly by requesting help from the robot 2 that appropriately supplements the lack of capability of the robot 1.

Note that the control device according to the present embodiment may be included in the robot 1. Alternatively, the control device according to the present embodiment may be included in an information processing server or the like connected with the robot 1 via a network. The control device according to the present embodiment may be included in any device as long as the control device can control the robot 1 and the like.

2. Exemplary Configuration of Control Device

Figure 2:
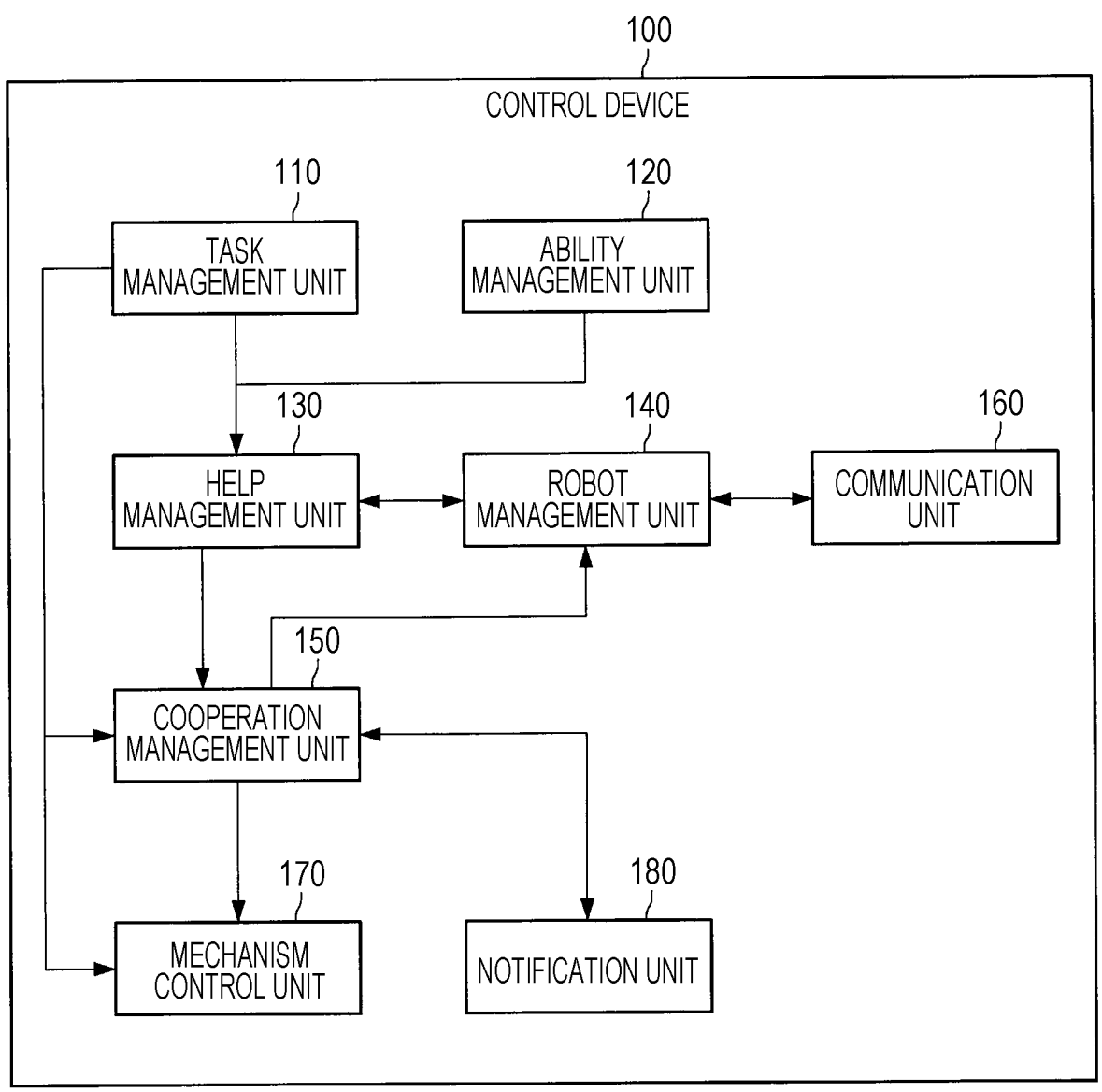
FIG. 2 is a block diagram illustrating an internal configuration of the control device according to the embodiment.

Next, the internal configuration of the control device according to the present embodiment will be described with reference to FIGS. 2 to 6. FIG. 2 is a block diagram illustrating an internal configuration of a control device 100 according to the present embodiment. In the following, it is assumed that the control device 100 is included in the robot 1 illustrated in FIG. 1, and a case where the control device 100 causes the robot 1 and the robot 2 to cooperate will be described.

As illustrated in FIG. 2, the control device 100 includes a task management unit 110, an ability management unit 120, a help management unit 130, a robot management unit 140, a communication unit 160, a cooperation management unit 150, a mechanism control unit 170, and a notification unit 180.

The task management unit 110 manages tasks allocated to the robot 1 and determines the ability required for execution of each of the tasks. Specifically, the task management unit 110 manages the start time, the end time, and the execution period of a task which is allocated to the robot 1 and is to be executed (that is, a reserved state) or being executed. The task management unit 110 further refers to a database that covers the ability used for execution of each of the tasks, thereby determining the ability required for execution of each of the tasks allocated to the robot 1. The ability used for execution of the task includes, for example, the mobility of the robot 1, the manipulation (lifting) ability, the ability to notify a user, the knowledge possessed by the robot 1, or the like.

The ability management unit 120 determines the capability of the robot 1 at predetermined timing as of that timing. Specifically, the ability management unit 120 determines the capability indicating the ability that the robot 1 can execute on the basis of the ability of the hardware and software of the robot 1 and the state of the robot 1 at the time of the determination. For example, the ability management unit 120 may determine, as the capability of the robot 1, the ability that can be executed after subtraction of the ability used in the task that the robot 1 is executing at the time of determination and the ability or the like unavailable due to a failure, etc. from the ability based on the hardware and software specifications of the robot 1.

As described above, the capability of the robot 1 determined by the ability management unit 120 can vary depending on the execution status of a task of the robot 1. Therefore, the ability management unit 120 may determine the capability of the robot 1 at the start and end timing of the task of the robot 1 and update the capability of the robot 1. Specifically, at the start of the task, the ability management unit 120 may update, as the capability of the robot 1, the ability that can be executed after subtraction of the ability used in the task from the ability based on the specifications of the robot 1. In addition, in a case where the ability that has been in use in the task is released due to the completion of the task, the ability management unit 120 may update the ability based on the specifications of the robot 1 as the capability of the robot 1 upon the completion of the task.

Note that the capability of the robot 1 determined by the ability management unit 120 may change due to an unexpected situation change such as a malfunction or a failure of the robot 1 or a task that is not recognized by the robot 1 (for example, an irregular task). Therefore, the ability management unit 120 may determine the capability of the robot 1 at predetermined intervals and update the capability of the robot 1. For example, the ability management unit 120 may determine the capability of the robot 1 when the robot 1 is started or shut down, or every few days to update the capability of the robot 1.

Here, with reference to FIG. 3, the capability determined by the ability management unit 120 will be described with a specific example. FIG. 3 is a table illustrating a specific example of capability determined by the ability management unit 120.

As illustrated in FIG. 3, the capability determined by the ability management unit 120 are divided into a plurality of categories such as the mobility, the manipulation, and the knowledge, and more detailed functions and attributes are set for each of the categories.

For example, the highest possible speed of travelling, the lowest possible speed of travelling, the possible travel distance, the level difference that can be stepped over, the travelling direction, and the width that allows travelling are set as functions in the category of mobility, and an attribute is set for each of the functions. In the category of manipulation, the weight that can be lifted, the lowest possible height to be lifted to, the highest possible height to be lifted to, the shape that allows lifting, and the size that allows lifting are set as functions, and an attribute is set for each of the functions. In the category of knowledge, map information (for example, map information of a building in which the robot 1 works) and languages are set as functions, and an attribute is set for each of the functions.

Furthermore, as illustrated in FIG. 3, the capability determined by the ability management unit 120 may include information related to the time axis for execution of each function. Specifically, for some ability of the capability, possible start time and a secured ability duration for execution of the ability may be set. In the control device 100 according to the present embodiment, a help list is generated depending on the capability of the robot 1 that changes in the time axis direction on the basis of the situation or the like of the robot 1, and selects a robot having the ability indicated in the help list as a cooperation target for execution of the task. Therefore, in a case where the capability determined by the ability management unit. 120 includes information related to the time axis, the control device 100 can select a more appropriate robot as a cooperation target.

The help management unit 130 generates a help list indicating the ability required for the robot 1 to execute a task. Specifically, the help management unit 130 compares the ability required for execution the task allocated to the robot 1 with the capability of the robot. 1 to generate a help list indicating the ability required for the robot 2 to execute the task (that is, the ability that is further required in addition to the ability of the robot 1).

For example, first, the help management unit 130 compares the ability required for execution off the task that has been determined by the task management unit 110 with the capability of the robot 1 determined by the ability management unit 120. Subsequently, the help management unit 130 determines whether or not the capability of the robot 1 satisfies the ability necessary for execution of the task. Furthermore, in a case where the capability of the robot 1 does not satisfy the ability necessary for execution of the task, the help management unit 130 determines the capability required for the other robot 2 to execute the task, and a help list indicating the ability is generated.

Here, with reference to FIGS. 4 and 5, the help list generated by the help management unit 130 will be described with a specific example. FIGS. 4 and 5 are tables each illustrating a specific example of a help list generated by a help management unit 130.

As illustrated in FIGS. 4 and 5, the help list generated by the help management unit. 130 is divided into a plurality of categories such as mobility, manipulation, and knowledge like in the case of the capability, and more detailed functions and attributes are set for each of the categories. Note that "No Request" indicates that the robot 1 satisfies the ability necessary for execution of the task and that no request is made with regards to that ability.

For example, the help list illustrated in FIG. 4 indicates attributes or the like required for the robot 2 for execution of the task in terms of the functions of possible speed of travelling and possible travel distance in the category of mobility. In addition, attributes or the like required for the robot 2 to execute the task is indicated in terms of in the functions of the weight that can be lifted, a possible height to be lifted to, the shape that allows lifting, and the size that allows lifting.

For example, in FIG. 5, the attribute or the like required for the robot 2 to execute the task is illustrated in terms of the map information of the knowledge category.

Note that as illustrated in FIGS. 4 and 5, the help lists generated by the help management unit 130 may include information related to the tame axis for execution of each function like in the case of capability. Specifically, for some ability in the help list, possible start time and a secured ability duration for execution of the ability may be set like in the case of capability. In the present embodiment, by comparing the help list and the capability of the robot 2, it is determined whether or not the task can be executed in cooperation with the robot 2. Therefore, the help list generated by the help management unit 130 includes information similar to that of the capability, and thus comparison between the help list and the capability of the robot 2 can be easily made.

Moreover, the help management unit 130 compares the generated help list with the capability of the robot 2 selected as the cooperation target, and thereby determines whether or not the capability of the robot 2 satisfies the ability indicated in the help list. Specifically, first, the help management unit 130 acquires the capability of the robot 2 from the cooperation target robot 2 selected by the robot management unit 140 as described later. Net, the help management unit 130 compares the generated help list with the acquired capability of the robot 2 to determine whether or not the capability of the robot 2 satisfies the ability indicated in the help list.

Note that the comparison between the generated help list and the capability of the robot 2 selected as the cooperation target and determination as to availability of cooperation can be provided may be executed by the robot 2 as the cooperation target. Specifically, the help management unit 130 may cause the robot 2 to compare the help list and the capability of the robot 2 and to determine availability of cooperation by transmitting the help list generated by the help management unit 130 to the robot 2 selected as the cooperation target. In such a case, the help management unit. 130 may receive the determination result of the availability of cooperation from the robot 2 having been selected as the cooperation target, and thereby determine whether or not the capability of the robot 2 satisfies the ability indicated in the help list.

Moreover, in a case where the capability of the robot 1 changes, the help management unit 130 may regenerate the help list on the basis of the changed capability. For example, in a case where the ability management unit 120 updates the capability of the robot 1 on the basis of an unexpected situational change of the robot 1, a task that is not recognized by the robot 1, or the like, the help management unit 130 may update the help list on the basis of the updated capability.

In such a case, the ability required for the robot 2 as the cooperation target may increase in the updated help list depending on a change in the capability of the robot 1. Therefore, in a case where the robot 1 and the robot 2 are executing a task in cooperation, the help management unit 130 may determine whether or not to continue the execution of the task by the cooperation between the robot 1 and the robot. 2 on the basis of the updated help list.

Specifically, the help management unit 1:30 may determine again whether or not the capability of the robot 2 in cooperation satisfies the ability indicated in the updated help list. In a case where the capability of the robot 2 in cooperation satisfies the ability indicated in the updated help list, the help management unit 130 determines to continue the cooperation between the robot 1 and the robot 2. On the other hand, in a case where the capability of the robot 2 in cooperation does not satisfy the ability indicated in the updated help list, the help management unit 130 determines to cancel the cooperation between the robot 1 and the robot 2. In a case where the cooperation between the robot 1 and the robot 2 is cancelled, the control device 100 attempts execution of the task in cooperation with another robot on the basis of the updated help list.

The robot management unit 140 detects the robot 2 as a cooperation target of the robot 1 and manages the robot 2. Specifically, the robot management unit 140 may select the robot 2 that cooperates with the robot 1 from at least one or more robots coupled with the robot 1 through communication or a network. For example, the robot management unit 140 may select the robot 2 that cooperates with the robot 1 from at least one or more robots that are within a range where wireless communication (for example, Bluetooth (registered trademark)) by the communication unit 160 is available. Alternatively, the robot management unit 140 may select the robot 2 that cooperates with the robot 1 from at least one or more robots coupled to a network to which the control device 100 is coupled via the communication unit 160.

Alternatively, in a case where an imaging device is mounted on the robot 1, the robot management unit 140 may select the robot 2 that cooperates with the robot 1 from at least one or more robots included in an image captured by the imaging device in other words, the robot management unit 140 may select the robot 2 that cooperates with the robot 1 from at least one or more robots that are in the field of view of the robot 1. Specifically, the robot management unit 140 may image the surrounding environment of the robot 1 by the imaging device mounted on the robot 1, identify a robot captured in the image by image recognition, and thereby select the robot captured in the image as the robot 2 that cooperates with the robot 1.

Furthermore, in a case where the robot management unit 140 can acquire map information and position information of each robot in the map information, the robot management unit 140 may select the robot 2 that cooperates with the robot 1 from among at least one or more robots within a range of travel at the time of execution of the task.

However, the robot 2 that executes a task in cooperation with the robot 1 needs to transmit/receive information to/from the robot 1 or the control device 100 for synchronization or the like of processing. Therefore, in a case where the robot 2 that cooperates with the robot 1 is selected from at least one or more robots that are coupled to the robot 1 through communication or a network, the communication path is already established. Thus, the robot management unit 140 can omit the process of establishing a communication path between the robot 1 and the robot 2.

Here, in a case where there is a plurality of robots that may cooperate with the robot 1, the robot management unit 140 may select the robot 2 that cooperates with the robot 1 on the basis of the similarity of the capability of each of the robots and the robot 1. Specifically, the robot management unit 140 may select a robot having higher similarity of the capability with the robot 1 as the robot 2 that cooperates with the robot 1.

The similarity in the capability of each of the robots and the robot 1 refers specifically to similarity in terms of attributes, the start time, the secured ability duration, or the like for each of the functions of the capability. For example, in the specific example of the capability illustrated in FIG. 3, the closer the numerical values indicated in the respective columns of the attribute, the start time, and the secured ability duration of a robot as a cooperation target and the robot 1 are, it can be said that the similarity in the capability between the robot as the cooperation target and the robot 1 is higher. The higher the similarity in the capability of robots is, the higher the synchronization and the cooperativity of operation between the robots in cooperate becomes at the time of execution of a task, and thus it becomes possible to execute the task more smoothly in cooperation of the robots.

Moreover, in a case where there is a plurality of robots that may cooperate with the robot 1, the robot management unit 140 may select the robot 2 that cooperates with the robot 1 on the basis of the complementarity of the capability between each of the robots and the robot 1. Specifically, the robot management unit 140 may select a robot having higher complementarity of the capability with the robot 1 as the robot 2 that cooperates with the robot 1.

The complementarity of the capability between each of the robots and robot 1 refers specifically to a degree to which each of the functions of the capability overlaps or does overlap. For example, in the specific example of the capability illustrated in FIG. 3, it can be said that the complementarity of the capability between the robot as the cooperation target and the robot 1 is higher as the robot as the cooperation target possesses more of the functions that the robot 1 does not possess with regard to the functions of the categories of mobility, manipulation, and knowledge. The higher the complementarity of capability between robots is, the higher the possibility becomes that even if an unexpected situation occurs during execution of a task, the situation can be handled by a function possessed by either one of the robots being in cooperation. Therefore, execution of the task by cooperation between robots can be performed more smoothly.

Moreover, in a case where there is a plurality of robots that may cooperate with the robot 1, the robot management unit 140 may select the robot 2 that cooperates with the robot 1 on the basis of an evaluation value of each of the robots. Specifically, the robot management unit 140 may select a robot having a higher evaluation value as the robot that cooperates with the robot 1.

An evaluation value of a robot refers specifically to a degree to which execution of a task by cooperation between the robot 1 and the robot has been successful. There are cases where execution of a task by cooperation between the robot 1 and the other robot 2 ends being incomplete due to interruption of communication between the robot 1 and the robot 2, interruption processing by a user of the robot 2, or other reasons. Therefore, the robot management unit 140 may set an evaluation value for each robot on the basis of results of completion or incompletion of tasks having been executed in cooperation with the robot 1 previously.

For example, the robot management unit 140 may perform processing of increasing the evaluation value of the robot 2 in a case where execution of a task by cooperation between the robot 1 and the robot 2 is completed. Contrary, the robot management unit 140 may perform processing of decreasing the evaluation value of the robot 2 in a case where execution of a task by cooperation between the robot 1 and the robot 2 is incomplete due to interruption processing by a user.

According to this configuration, the robot management unit 140 can preferentially select a robot having a high success rate of execution of tasks by cooperation with the robot 1 as a robot that cooperates with the robot 1. Note that the evaluation value of the robot 2 can be substituted with another index. For example, there is a possibility that the evaluation value of the robot 2 depend on a user who is the owner of the robot 2. Therefore, as the evaluation value of the robot 2, the reputation, evaluation, or the like of a social networking service (SNS) of the user who is the owner of the robot 2 may be used in substitution.

Here, in a case where there is a plurality of robots that may cooperate with the robot 1, the robot management unit 140 may select the robot 2 that cooperates with the robot 1 on the basis of a plurality of perspectives such as the similarity and complementarity of the capability between each of the robots and the robot 1 and evaluation values or the like of the respective robots. Specifically, the robot management unit 140 may select, as the robot 2 that cooperates with the robot 1, a robot having a higher index that is calculated from a mathematical formula weighting each of the multiple perspectives of the similarity and complementarity of capability with the robot 1 and an evaluation value. In such a case, the robot management unit 140 can select a robot that is determined to be appropriate as a cooperation target from a plurality of perspectives as the robot 2 that cooperates with the robot 1.

Figures 6, 7:
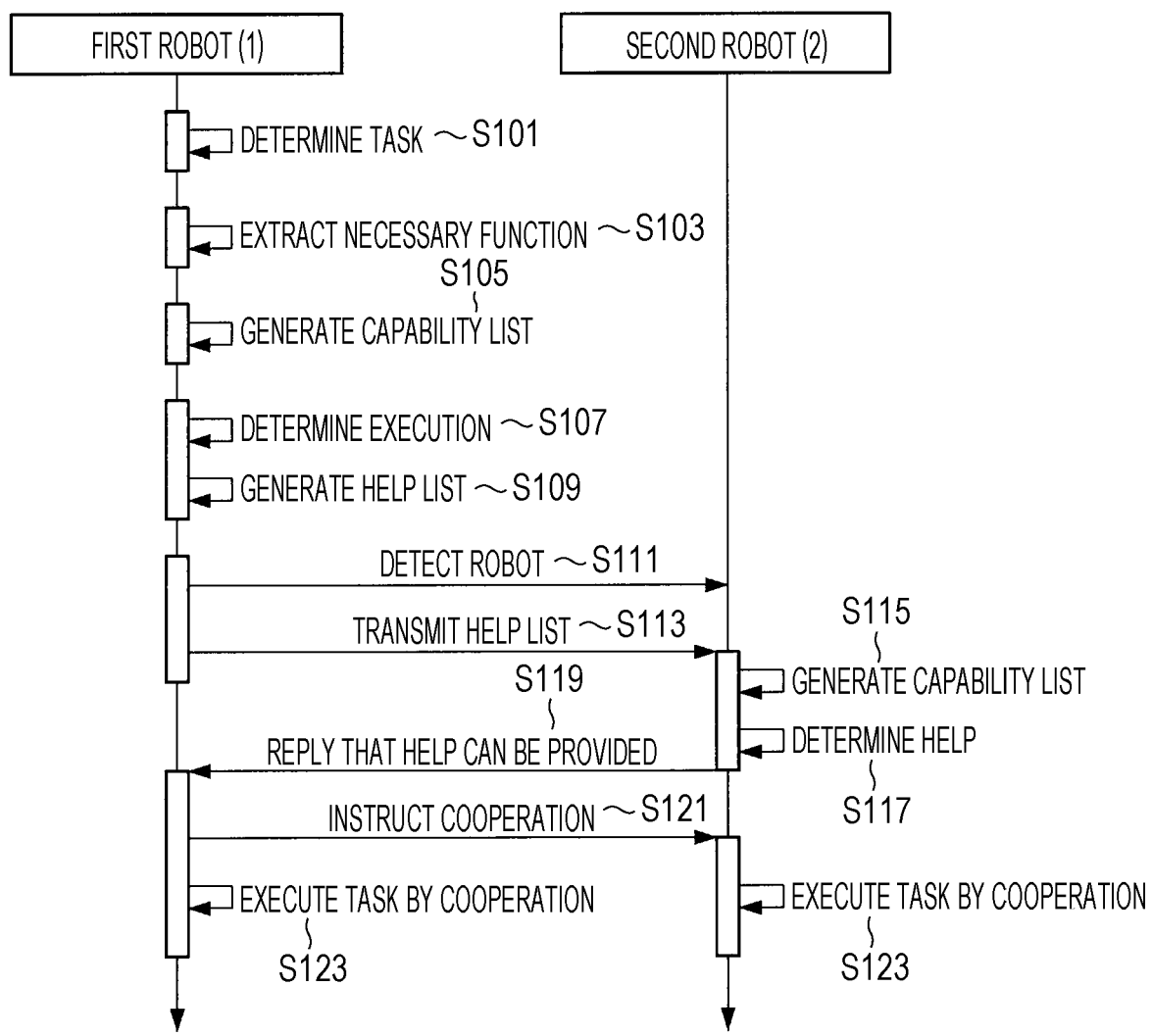
FIG. 6 is a table illustrating a specific example of similarity, complementarity, and an evaluation value of a robot managed by a robot management unit.
FIG. 7 is a sequence diagram explaining first exemplary control by the control device.

Here, with reference to FIG. 6, similarity, complementarity, and an evaluation value of a robot managed by the robot management unit 140 will be described with a specific example. FIG. 6 is a table illustrating a specific example of similarity, complementarity, and an evaluation value of a robot managed by the robot, management unit 140.

As illustrated in FIG. 6, the similarity, the complementarity, and the evaluation value of the robot managed by the robot management unit 140 may be managed by numerical values of 0 to 100, for example. The robot management unit 140 may calculate and manage similarity, complementarity, and an evaluation value for each of the robots. For example, when receiving the capability of the robot 2 from the robot 2, the robot management unit 140 may calculate the similarity and complementarity of capability of the robot 1 and the robot 2 and manage the similarity and complementarity of the robot 2. In addition, the robot management unit 140 may manage the evaluation value of the robot 2 by increasing the evaluation value every time execution of a task by cooperation between the robot 1 and the robot 2 is completed, and decreasing the evaluation value every time execution of a task by cooperation between the robot 1 and the robot 2 ends being incomplete.

Note that the robot management unit 140 may select a robot as a cooperation target for execution of a task by further using elements other than the elements described above. Specifically, in a case where there is a plurality of robots that may be cooperation targets, the robot management unit 140 may select a robot that enables shortest time to start cooperation as the robot as the cooperation target. Furthermore, in a case where the number of robots that cooperate with the robot 1 for execution of the task is greater than or equal to two (that is, in a case where the task is executed by cooperation of three or more robots), the robot management unit 140 may select robots as cooperation targets so that the number of robots that cooperate becomes the smallest.

The communication unit 160 is a communication device or an external connection interface that transmits and receives information between the robot 1 and another robot.

Specifically, the communication unit 160 may be an antenna and a communication circuit that perform wireless communication. For example, the communication unit 160 may be an antenna and a communication circuit that perform communication using wavelength signals in bands of several hundred MHz to several GHz such as Wi-Fi (registered trademark), ZigBee (registered trademark), Bluetooth (registered trademark), Bluetooth Low Energy (registered trademark), ANT (registered trademark), ANT+(registered trademark), EnOcean Alliance (registered trademark), or mobile communication such as 3G or long term evolution (LTE).

Alternatively, the communication unit 160 may be an external connection interface that is coupled with an external network or a device (including a robot) by wire or wirelessly. For example, the communication unit 160 may be a wired or wireless external connection interface such as a universal serial bus (USB) interface, an Ethernet (registered trademark) interface, or the IEEE 802.11 standards interface.

The cooperation management unit 150 manages and controls the overall cooperation between the robot 1 and the robot 2 as the cooperation target for execution of a task. Specifically, the cooperation management unit 150 outputs an instruction to the robot 2, which is determined to have capability that satisfies the ability indicated in the help list, to execute the task in cooperation with the robot 1. For example, the cooperation management unit 150 determines the configuration how each of the robots 1 and 2 cooperates, and outputs instructions of the determined configuration to each of the robots 1 and 2. Furthermore, the cooperation management unit 150 may also control the synchronization processing between the robot 1 and the robot 2 as the cooperation target, processing at the time of abnormality handling, and interruption processing at the occurrence of interruption during the execution of the task by cooperation.

Note that similarly in a case where there are three or more robots as cooperation targets, the cooperation management unit 150 can determine the configuration how each of the robots cooperates, and output instructions of the determined configuration to each of the robots.

The mechanism control unit 170 controls the overall operation of each mechanism of the robot 1. Specifically, the mechanism control unit 170 controls operation of each unit of the robot 1 by controlling driving of an arm unit (for example, a manipulator) and a leg unit (for example, a motor for driving the leg part or a wheel) included in the robot 1. In a case where a task is executed by the robot 1 alone, the mechanism control unit 170 executes the task instructed by the task management unit 110. In addition, the mechanism control unit 170 executes operation or a function instructed by the cooperation management unit 150 in a case where a task is executed in cooperation with a plurality of robots.

The notification unit 180 is a display unit or a sound output unit for notifying a user or the like. The notification unit 180 may notify a user of, for example, a cooperation status with another robot, an approval request for cooperation with another robot, or other information. The notification unit 180 may be a display device or the like such as a cathode ray tube ((Tim display device, a liquid crystal display device, or an organic electroluminescence (organic EL) display device, or may be an audio output device such as a speaker or headphones.

According to the configuration described above, the control device 100 according to the present embodiment can cause the robot 1 to execute a task smoothly by flexibly performing cooperation with the other robot. 2 even in a case where the capability of the robot 1 alone is insufficient for execution of the task.

3. Exemplary Control

Next, specific exemplary control by the control device 100 according to the present embodiment will be described with reference to FIGS. 7 to 14. Note that examples of control by the control device 100 will be described separately for first to eighth exemplary control.

3.1. First. Exemplary Control

First, first exemplary control by the control device 100 according to the present embodiment will be described with reference to FIG. 7. FIG. 7 is a sequence diagram explaining the first exemplary control by the control device 100.

As illustrated in FIG. 7, first, a task to be allocated to the first robot 1 is determined (S101). Next, the task management unit 110 extracts functions and ability necessary for execution of the allocated task (S103). In addition, the ability management unit 120 generates a capability list indicating the capability of the first robot 1 as of the current time (S105).

Subsequently, the help management unit 130 compares the function and ability necessary for execution of the task with the capability of the first robot 1, and it is thereby determined whether or not the task can be executed by the first robot 1 alone (S107). If the task can be executed by the first robot 1 alone, the first robot 1 alone executes the task. On the other hand, if the task cannot be executed by the first robot 1 alone, the help management unit 130 generates a help list indicating the ability required for execution of the task (S109).

Next, the robot management unit 140 detects the second robot 2 that can cooperate with the first robot 1 via communication, a network, or the like (S111), and a help list is transmitted to the second robot 2. (S113). In the second robot 2 that has received the help list, a capability list indicating the capability of the second robot 2 as of the current time is generated. (S115). Thereafter, the second robot 2 compares the capability of the second robot 2 with the received help list to determine whether or not a help can be provided (S117).

If the second robot 2 determines that a help can be provided, a reply indicating that a help can be provided is transmitted from the second robot 2 to the first robot 1 (S119). In the first robot 1 that has received the reply that a help can be provided, the cooperation management unit 150 issues a cooperation instruction to the second robot 2 (S121), and the task is executed by cooperation between the first robot 1 and the second robot 2 (S123).

3.2. Second Exemplary Control

Figure 8:
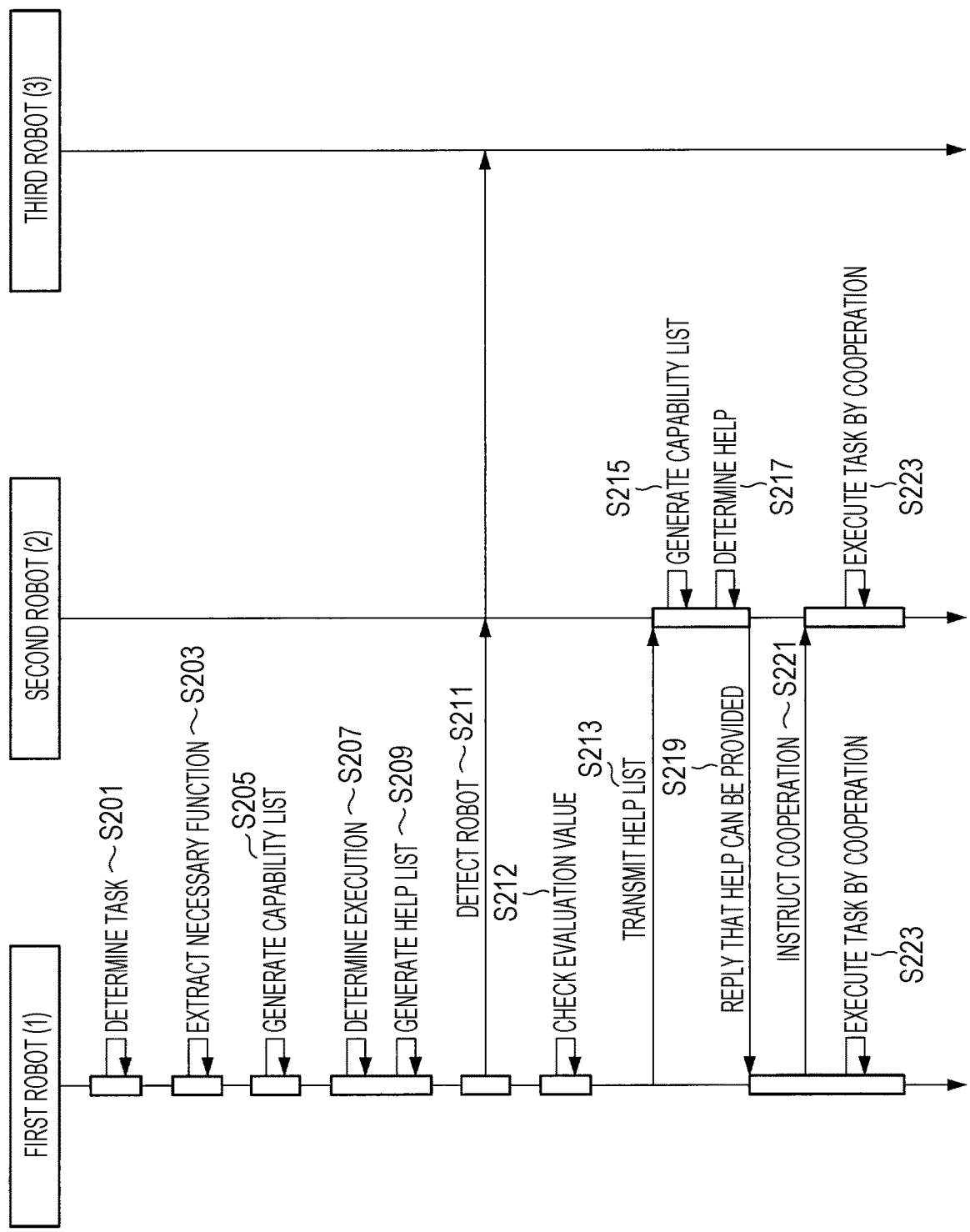
FIG. 8 is a sequence diagram explaining second exemplary control by the control device.

Next, second exemplary control by the control device 100 according to the present embodiment will be described with reference to FIG. 8. FIG. 8 is a sequence diagram explaining the second exemplary control by the control device 100. The second exemplary control is different from the first exemplary control in that a robot as a cooperation target is selected from a plurality of detected robots by referring to an evaluation value or the like.

As illustrated in FIG. 8, first, a task to be allocated to the first robot 1 is determined. (S201). Next, the task management unit 110 extracts functions and ability necessary for execution of the allocated task (S203). In addition, the ability management unit 120 generates a capability list indicating the capability of the first robot 1 as of the current time (S205).

Subsequently, the help management unit 130 compares the function and ability necessary for execution of the task with the capability of the first robot 1, and it is thereby determined whether or not the task can be executed by the first robot 1 alone (S207). If the task can be executed by the first robot. 1 alone, the first robot 1 alone executes the task. On the other hand, if the task cannot be executed by the first robot 1 alone, the help management unit 130 generates a help list indicating the ability required for execution of the task (S209).

Next, the robot management unit 140 detects robots (the second robot 2 and a third robot 3) that can cooperate with the first robot 1 via communication or a network (S211). Subsequently, the robot management unit 140 refers to the similarity or complementarity of capability between the first robot 1 and the second robot 2 and the third robot 3, or an evaluation value and the like of each of the second robot 2 and the third robot 3 and determines a robot to which a help list is to be transmitted (S212). Then, the help list is transmitted to the determined robot (second robot 2) (S213). In the second robot 2 that has received the help list, a capability list indicating the capability of the second robot 2 as of the current time is generated (S215). Thereafter, the second robot 2 compares the capability of the second robot 2 with the received help list to determine whether or not a help can be provided (S217).

If the second robot 2 determines that a help can be provided, a reply indicating that a help can be provided is transmitted from the second robot 2 to the first robot 1 (S219). In the first robot 1 that has received the reply that a help can be provided, the cooperation management unit 150 issues a cooperation instruction to the second robot 2 (S221), and the task is executed by the cooperation of the first robot 1 and the second robot 2 (S223).

3.3. Third Exemplary Control

Figure 9:
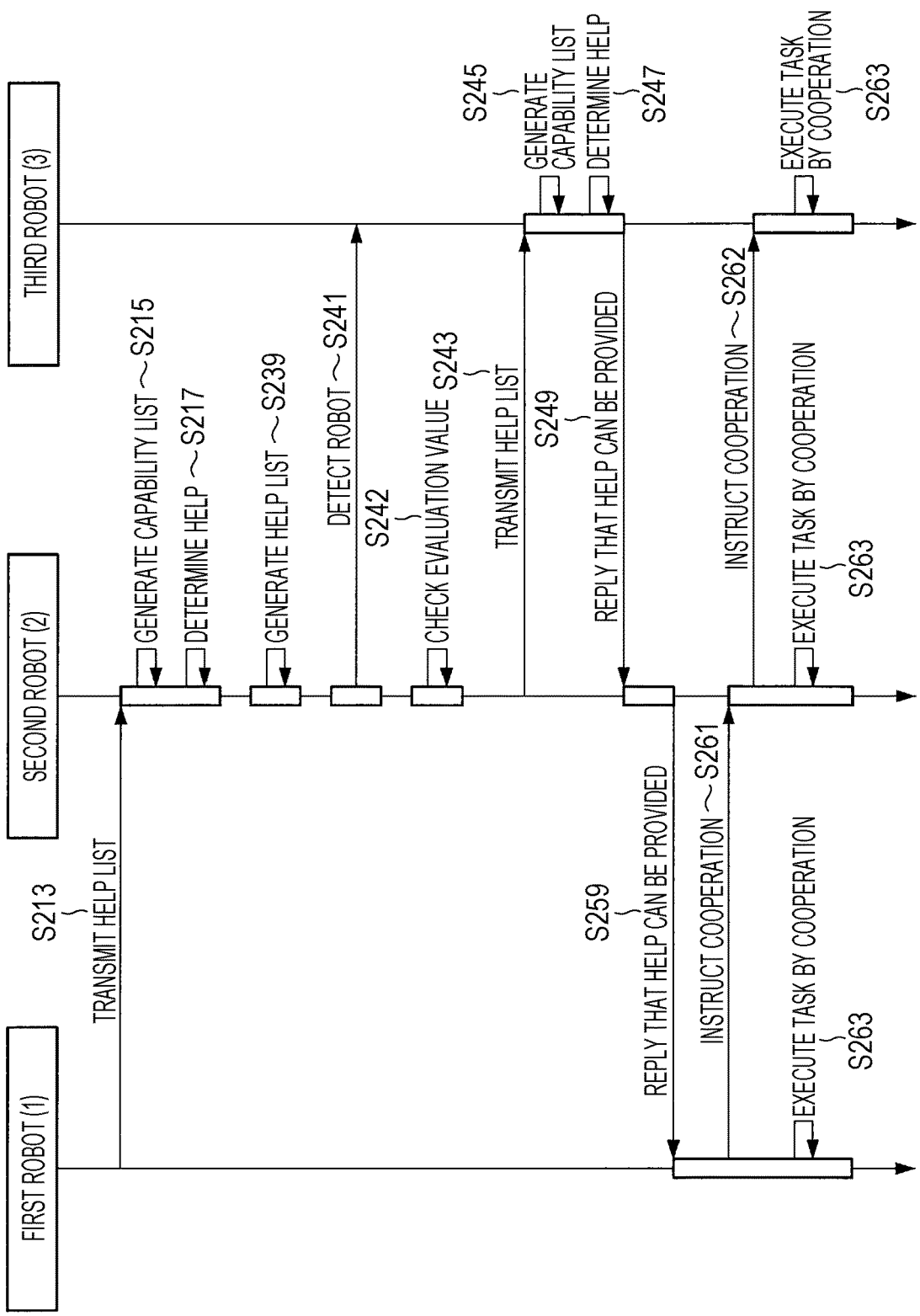
FIG. 9 is a sequence diagram explaining third exemplary control by the control device.

Next, third exemplary control by the control device 100 according to the present embodiment will be described with reference to FIG. 9. FIG. 9 is a sequence diagram explaining the third exemplary control by the control device 100. In the third exemplary control, an added point to the second exemplary control is that the second robot 2 that has received the help request from the first robot 1 further generates a help list and that the second robot 2 transmits a help request to the third robot 3.

Note that the third exemplary control has the same flow from S201 to S213 as that of the second exemplary control. Therefore, in the third exemplary control illustrated in FIG. 9, only the sequence after 8213 in the second exemplary control illustrated in FIG. 8 is illustrated.

As illustrated in FIG. 9, if a help list is transmitted from the first robot 1 to the second robot 2 (S213), in the second robot 2 that has received the help list, a capability list indicating the capability of the second robot 2 as of the current time is generated (S215). Thereafter, the second robot 2 compares the capability of the second robot 2 with the received help list to determine whether or not a help can be provided (S217).

At this point, if the capability of the second robot 2 cannot satisfy the ability indicated in the help list, the second robot 2 further generates a help list (S239). Note that the help list generated by the second robot 2 is obtained by subtracting the ability corresponding to the capability of the second robot 2 from the help list generated by the first robot 1.

Next, a robot (third robot 3) that can cooperate with the first robot 1 and the second robot 2 is detected by the second robot. 2 via communication or a network (S241). Subsequently, the second robot 2 refers to the similarity or complementarity of capability between the second robot 2 and the third robot. 3, or the evaluation value and the like of the third robot 3 and determines to transmit the help list to the third robot 3 (S242). Thereafter, the help list is transmitted to the third robot 3 (S243). In the third robot 3 that has received the help list, a capability list indicating the capability of the third robot 3 as of the current time is generated (S245). Thereafter, the third robot 3 compares the capability of the third robot 3 with the received help list to determine whether or not a help can be provided (S247).

If the third robot 3 determines that a help can be provided, a reply indicating that a help can be provided is transmitted from the third robot 3 to the second robot 2 (S249), and a reply indicating that a help can be provided is transmitted from the second robot 2 to the first robot 1 (S259) in the first robot 1 that has received the reply that a help can be provided, the cooperation management unit 150 issues a cooperation instruction to the second robot 2 (S261). Furthermore in the second robot 2, a cooperation instruction is issued to the third robot 3 (S262). As a result, the task is executed by cooperation of the first robot 1, the second robot 2, and the third robot 3 (S263).

3.4. Fourth Exemplary Control

Figure 10:
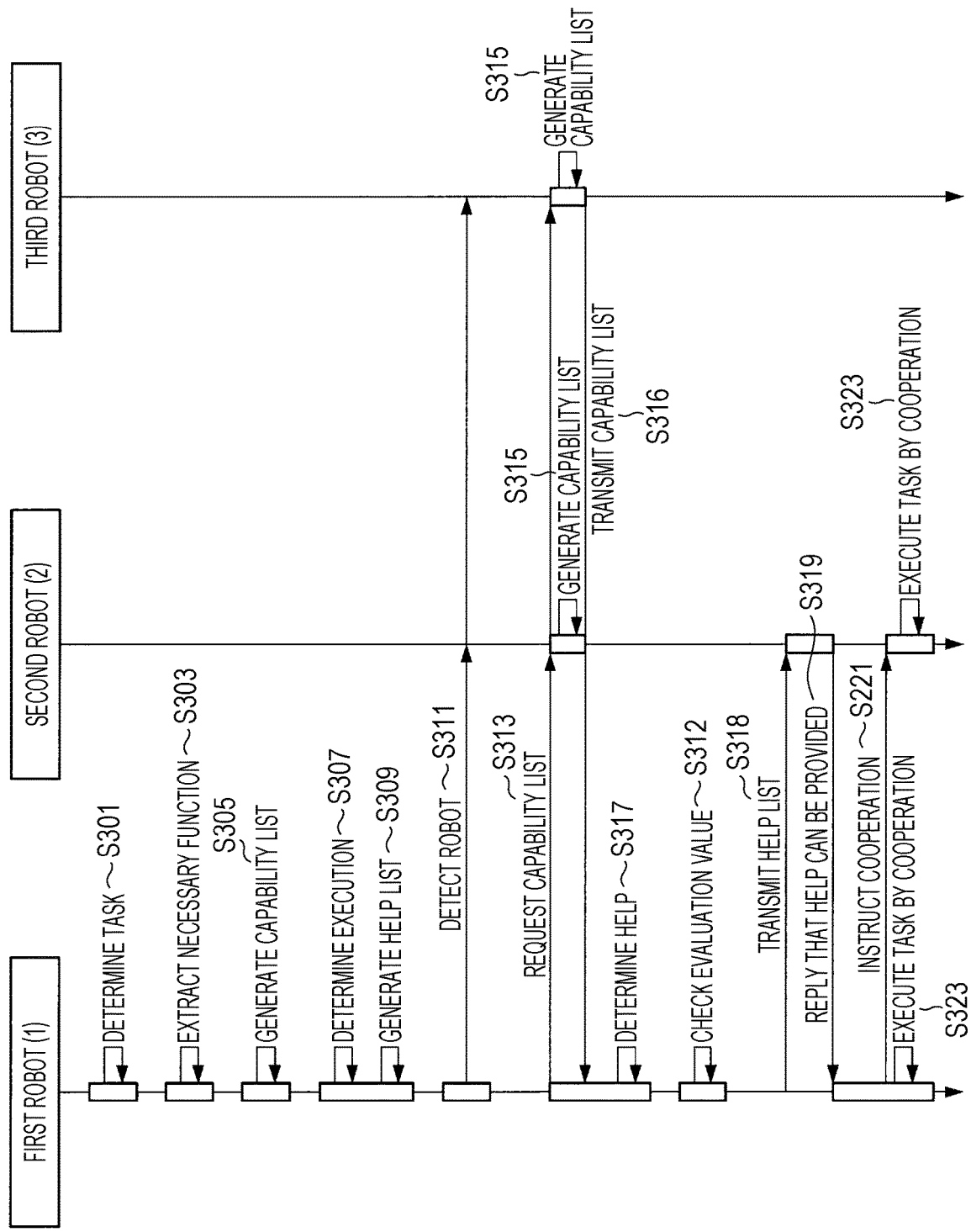
FIG. 10 is a sequence diagram explaining fourth exemplary control by the control device.

Next, fourth exemplary control by the control device 100 according to the present embodiment will be described with reference to FIG. 10. FIG. 10 is a sequence diagram explaining the fourth exemplary control by the control device 100. The fourth exemplary control is different from the second exemplary control in that the first robot 1 compares capability lists received from the respective robots with the help list to determine whether or not a help can be provided.

As illustrated in FIG. 10, first, a task to be allocated to the first, robot 1 is determined (S301). Next, the task management unit. 110 extracts functions and ability necessary for execution of the allocated task (S303). In addition, the ability management unit 120 generates a capability list indicating the capability of the first robot 1 as of the current time (S305).

Subsequently, the help management unit 130 compares the function and ability necessary for execution of the task with the capability of the first robot 1, and it is thereby determined whether or not the task can be executed by the first robot 1 alone (S307). If the task can be executed by the first robot 1 alone, the first robot 1 alone executes the task. On the other hand, if the task cannot be executed by the first robot 1 alone, the help management unit 130 generates a help list indicating the ability required for execution of the task (S309).

Next, the robot management unit 140 detects robots (the second robot 2 and the third robot 3) that can cooperate with the first robot 1 via communication or a network (S311). Here, the help management unit 130 requests the second robot 2 and the third robot 3 to transmit capability lists as of the current time (S313). In the second robot 2 and the third robot 3, capability lists each indicating the capability as of the current time are generated (S315), and each of the generated capability lists is transmitted to the first robot 1 (S316).

Subsequently, in the first robot 1, the help management unit. 130 compares the capability of each of the second robot 2 and the third robot 3 with the generated help list to determine whether or not a help can be provided in each of the second robot 2 and third robots 3 (S317). Furthermore, the robot management unit 140 refers to the similarity or complementarity of capability between the first robot 1 and the second robot 2 and the third robot 3, or an evaluation value and the like of each of the second robot 2 and the third robot 3. As a result, a robot to which a help request is to be transmitted is determined from among the robots that can provide a help (S312).

Then, the help request is transmitted to the determined robot (second robot 2) (S318). In the second robot 2 that has received the help request, a reply indicating that a help can be provided is transmitted to the first robot 1 (S319). In the first robot 1 that has received the reply that a help can be provided from the second robot 2, the cooperation management unit 150 issues a cooperation instruction to the second robot 2 (S321), and the task is executed by the cooperation of the first robot 1 and the second robot 2 (S323).

3.5. Fifth Exemplary Control

Figure 11:
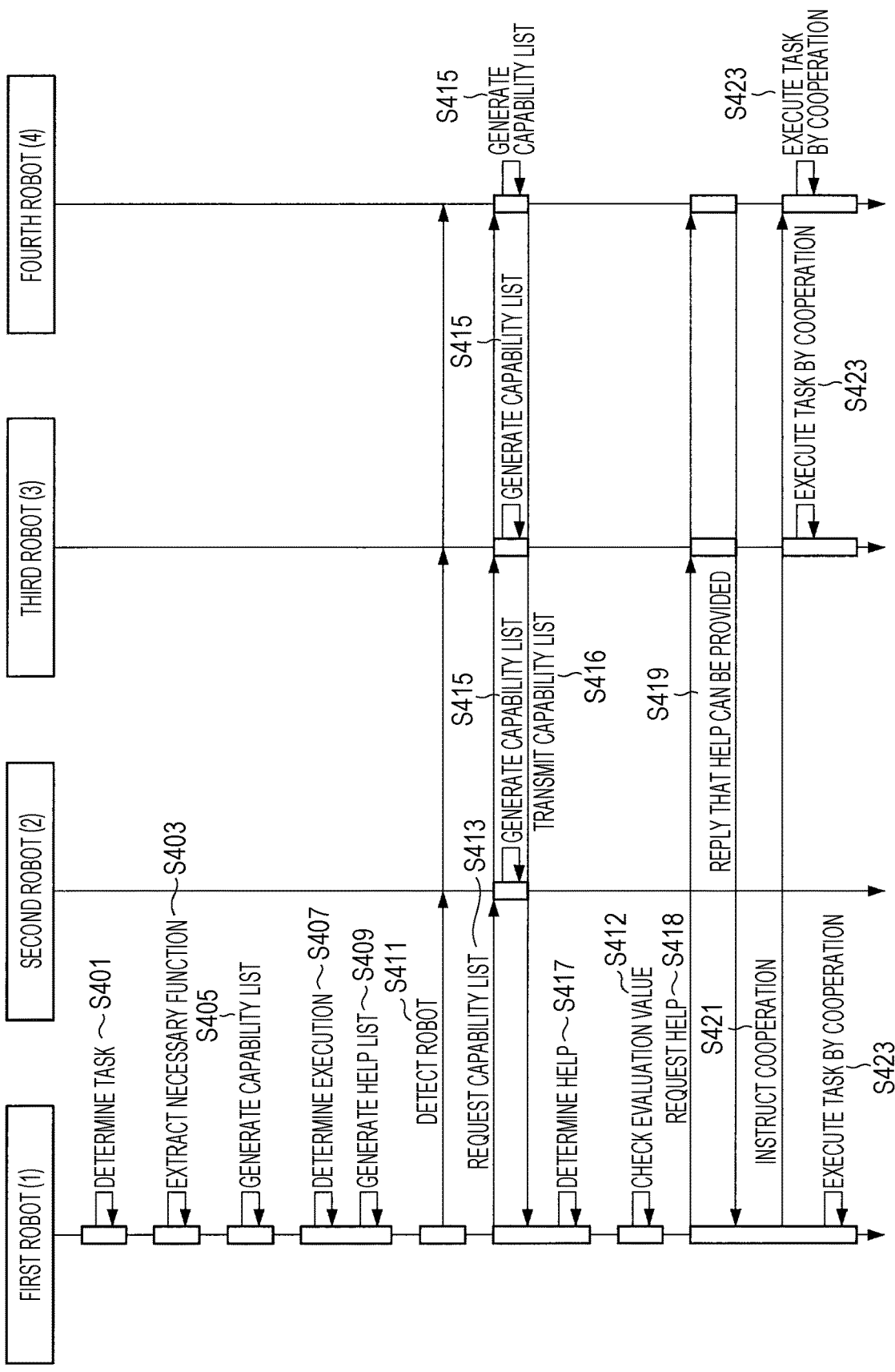
FIG. 11 is a sequence diagram explaining fifth exemplary control by the control device.

Next, fifth exemplary control by the control device 100 according to the present embodiment will be described with reference to FIG. 11. FIG. 11 is a sequence diagram explaining the fifth exemplary control by the control device 100. The fifth exemplary control is different from the fourth exemplary control in the number of detected robots and the number of robots as cooperation targets.

As illustrated in FIG. 11, first, a task to be allocated to the first robot 1 is determined (S401). Next, the task management unit 110 extracts functions and ability necessary for execution of the allocated task (S403). In addition, the ability management unit 120 generates a capability list indicating the capability of the first robot 1 as of the current time (S405).

Subsequently, the help management unit 130 compares the function and ability necessary for execution of the task with the capability of the first robot 1, and it is thereby determined whether or not the task can be executed by the first robot 1 alone (S407). If the task can be executed by the first robot 1 alone, the first robot 1 alone executes the task. On the other hand, if the task cannot be executed by the first robot 1 alone, the help management unit 130 generates a help list indicating the ability required for execution of the task (S409).

Next, the robot management unit 140 detects robots (the second robot 2, the third robot 3, and a fourth robot 4) that can cooperate with the first robot 1 via communication or a network (S411). Here, the help management unit 130 requests the second robot 2, the third robot 3, and the fourth robot 4 to transmit capability lists as of the current time (S413). In the second robot 2, the third robot 3, and the fourth robot 4, capability lists each indicating the capability as of the current time are generated (S415), and each of the generated capability lists is transmitted to the first robot 1 (S416).

Subsequently, in the first robot 1, the help management unit 130 compares the capability of each of the second robot 2, the third robot 3, and the fourth robot 4 with the generated help list to determine whether or not a help can be provided in each of the second robot 2, the third robot 3, and the fourth robot 4 (S417). Furthermore, the robot management unit 140 refers to the similarity or complementarity of capability between the first robot 1 and the second robot 2, the third robot 3, and the fourth robot 4, or an evaluation value or the like of each of the second robot 2, the third robot 3, and the fourth robot. As a result, robots to which a help request is to be transmitted are determined from among the robots that can provide a help (S412).

Then, the help request is transmitted to the determined robots (the third robot 3 and the fourth robot 4) (S418). In the third robot 3 and the fourth robot 4 that have received the help request, a reply indicating that a help can be provided is transmitted to the first robot 1 (S419). In the first robot 1 that has received the reply that a help can be provided from the third robot 3 and the fourth robot 4, the cooperation management unit. 150 issues a cooperation instruction to each of the third robot 3 and the fourth robot 4 (S421), and the task is executed by the cooperation of the first robot 1, the third robot 3, and the fourth robot 4 (S423).

3.6. Sixth Exemplary Control

Figure 12:
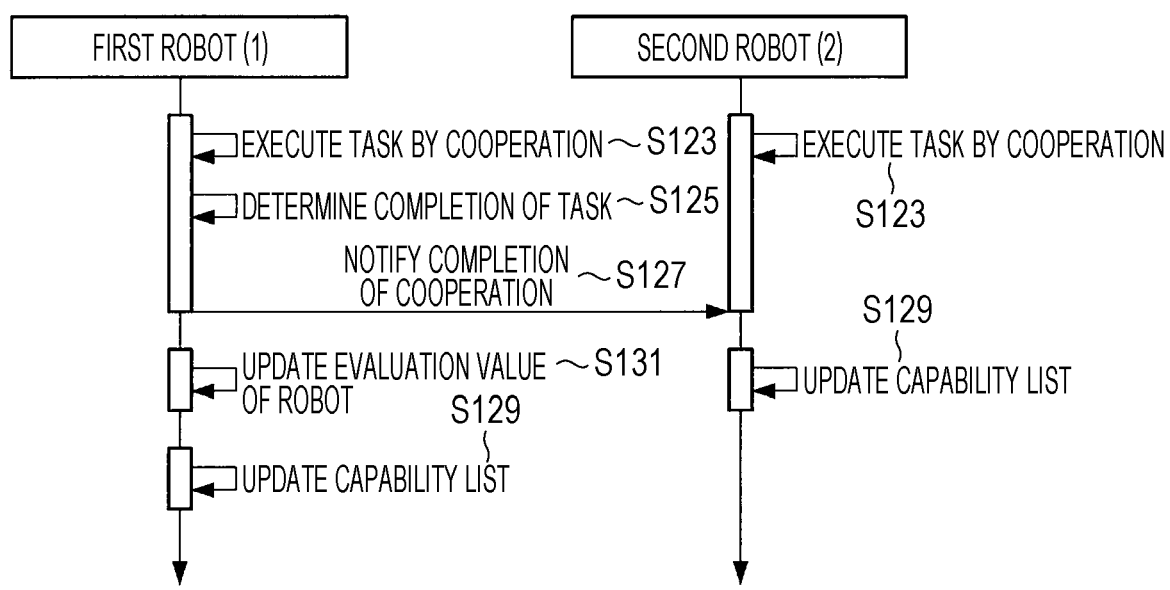
FIG. 12 is a sequence diagram explaining sixth exemplary control by the control device.

Next, sixth exemplary control by the control device 100 according to the present embodiment will be described with reference to FIG. 12. FIG. 12 is a sequence diagram illustrating the sixth exemplary control by control device 100. The sixth exemplary control is exemplary control in a case where execution of a task by cooperation as completed.

As illustrated in FIG. 12, first, a task is being executed by cooperation between the first robot 1 and the second robot 2 (S123). Here, the cooperation management unit 150 determines completion of the task (S125). If completion of the task is determined by the cooperation management unit 150, the cooperation management unit 150 transmits a notification of completion of the cooperation to the second robot 2 (S127). In the second robot 2 that has received the notification of completion of the cooperation, a capability list is updated since the ability that has been in use by the task is released upon completion of the task (S129).

Meanwhile, in the first robot 1, the robot management unit 140 updates the evaluation value of the second robot 2 after the completion of the task (S131). Specifically, in a case where execution of the task by the cooperation between the first robot 1 and the second robot 2 is successfully completed, the evaluation value of the second robot 2 is updated to a value increased by a predetermined value. Furthermore, a capability list is updated also in the first robot 1 since the ability that has been in use by the task is released along with the completion of the task (S129).

3.1. Seventh Exemplary Control

Figure 13:
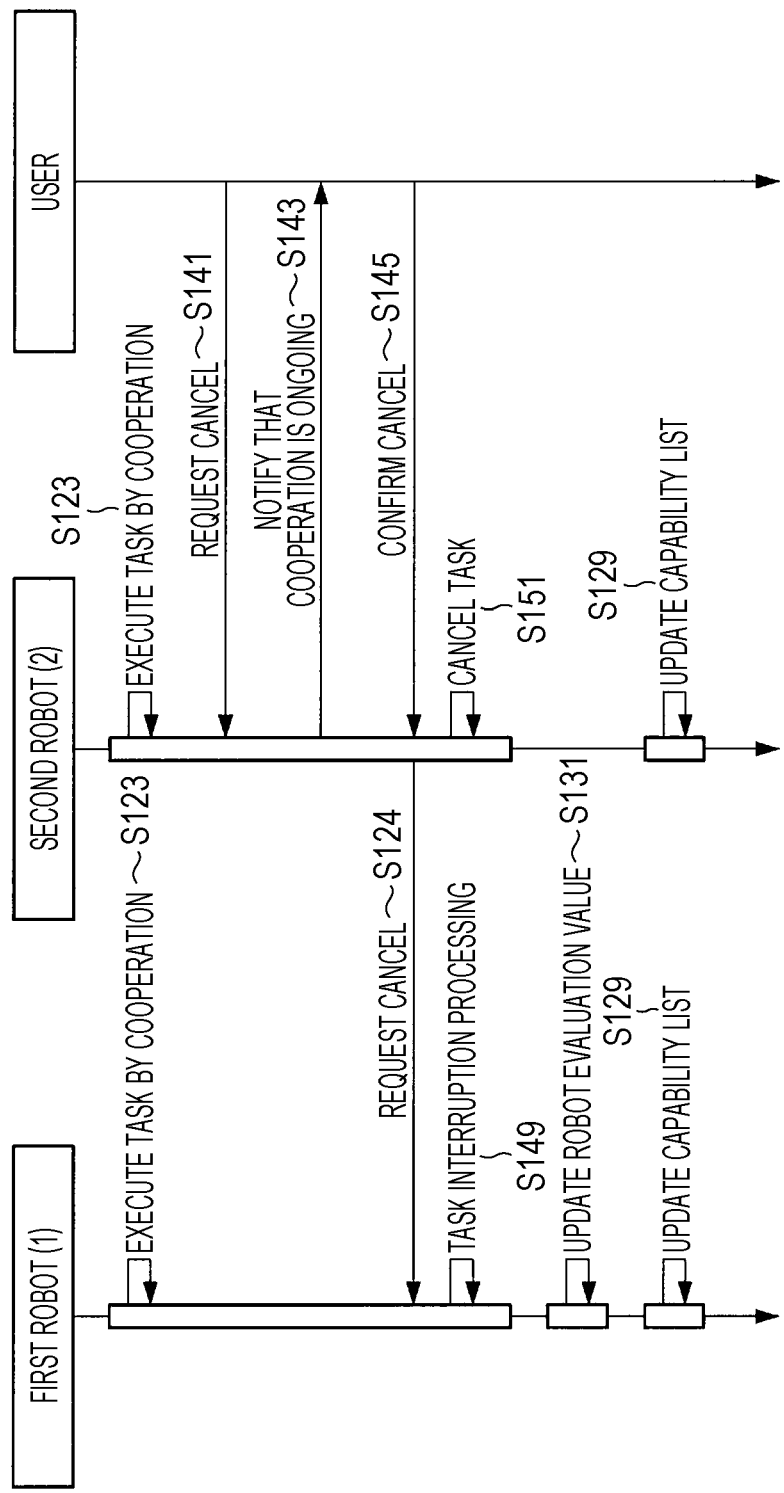
FIG. 13 is a sequence diagram explaining seventh exemplary control by the control device.

Next, seventh exemplary control by the control device 100 according to the present embodiment will be described with reference to FIG. 13. FIG. 13 is a sequence diagram illustrating the seventh exemplary control by control device 100. In the seventh exemplary control, execution of a task by cooperation ends being incomplete due to interruption processing by a user.

As illustrated in FIG. 13, first, a task is being executed by cooperation between the first robot 1 and the second robot 2 (S123). At this point, the user requests the second robot 2 to interrupt (cancel) execution of the task by cooperation (S141), the second robot 2 notifies the user that the task is being executed by cooperation (S143). If the user requests interruption of execution of the task after confirming the notification, the second robot 2 confirms the interruption of execution of the task by cooperation (S145), and transmits a request to interrupt execution of the task by cooperation to the first robot 1 (S147).

Thereafter, the second robot. 2 performs processing for interrupting execution of the task (S151). As a result, in the second robot 2, a capability list is updated since the ability that has been in use by the task is released upon completion of the task (S129). Meanwhile, in the first robot 1, processing to interrupt execution of the task is performed (S149), and then the robot management unit 140 updates the evaluation value of the second robot 2 (S131). Specifically, since execution of the task by the cooperation between the first robot 1 and the second robot 2 is interrupted, the evaluation value of the second robot 2 is updated to a value decreased by a predetermined value. Furthermore, a capability list is updated also in the first robot 1 since the ability that has been in use by the task is released along with the interruption of the task (S129).

3.8. Eighth Exemplary Control

Figure 14:
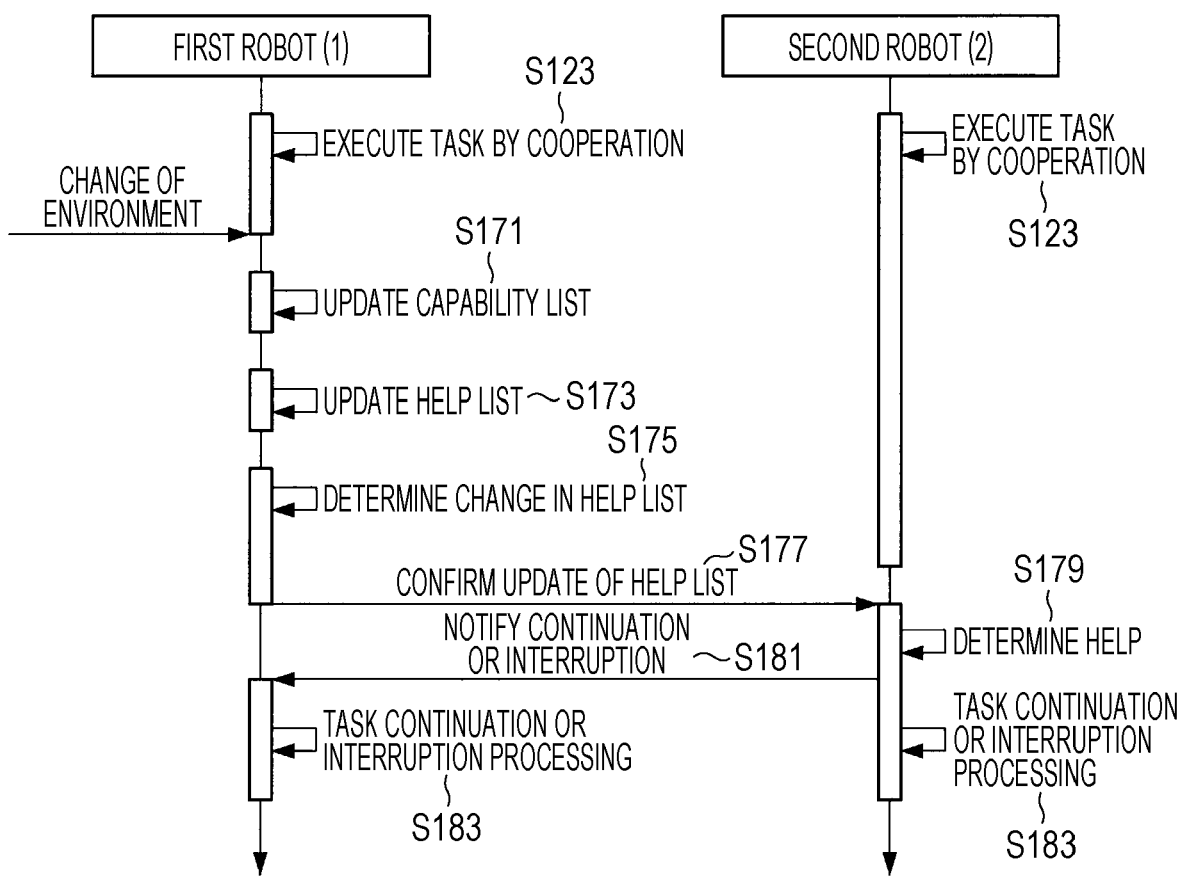
FIG. 14 is a sequence diagram explaining eighth exemplary control by the control device.

Next, eighth exemplary control by the control device 100 according to the present embodiment will be described with reference to FIG. 14. FIG. 14 is a sequence diagram illustrating the eighth exemplary control by control device 100. The eighth exemplary control is exemplary control in a case where the capability of the first robot 1 changes during execution of a task by cooperation.

As illustrated in FIG. 14, first, a task is being executed by cooperation between the first robot 1 and the second robot 2 (S123). At this point, if the state of the first robot 1 changes due to an environmental change or the like, the ability management unit 120 updates the capability list of the first robot. 1 on the basis of the changed state (S171). Subsequently, the help management unit 130 compares the function and ability necessary for execution of the task with the updated capability list, and an updated help list indicating the ability necessary for execution of the task is generated (S173).

Then, it is determined whether or not the help list has been changed after the update (S175). If there is no change in the help list, execution of the task by cooperation between the first robot 1 and the second robot 2 is continued. On the other hand, if there is a change in the help list, the help management unit 130 transmits the updated help list to the second robot. 2 and confirms whether or not the ability indicated in the updated help list is satisfied by the capability of the second robot 2 (S177). In the second robot 2, it is determined whether or not a help can be provided by the second robot 2 by comparing the updated help list with the capability of the second robot 2 (S179). Then the second robot 2 notifies the first robot 1 of the result of the determination whether or not provision of a help can be continued (S181). If it is determined that provision of a help can be continued, execution of the task by cooperation of the first robot 1 and the second robot 2 is continued. On the other hand, if it is determined that provision of a help cannot be continued, execution of the task by cooperation of the first robot 1 and the second robot 2 is interrupted (S183).

According to the above exemplary control, the control device 100 according to the present embodiment can flexibly execute a task by cooperation between the first robot 1 and another robot.

4. Hardware Configuration

Next, the hardware configuration of the control device 100 according to the present embodiment will be described with reference to FIG. 15. FIG. 15 is a block diagram illustrating an exemplary hardware configuration of the control device 100 according to the present embodiment. Note that information processing by the control device 100 according to the present embodiment is implemented by cooperation of software and hardware.

As illustrated in FIG. 15, the control device 100 includes a central processing unit (CPU) 901, a read only memory (ROM) 902, a random access memory (RAM) 903, a bridge 907, internal buses 905 and 906, an interface 908, an input device 911, an output device 912, a storage device 913, a drive 914, a connection port 915, and a communication device 916.

The CPU 901 functions as an arithmetic processing device or a control device, and controls the overall operation of the control device 100 according to various programs stored in the ROM 902 or the like. The ROM 902 stores programs and arithmetic operation parameters used by the CPU 901, and the RAM 903 temporarily stores programs used in execution of the CPU 901, parameters that vary as appropriate during the execution, and the like. For example, the CPU 901 may execute the functions of the task management unit 110, the ability management unit 120, the help management unit 130, the robot management unit 140, the cooperation management unit 150, and the mechanism control unit 170.

The CPU 901, the ROM 902, and the RAM 903 are connected to each other by the bridge 907, the internal buses 905 and 906, and the like. The CPU 901, the ROM 902, and the RAN 903 are also coupled to the input device 911, the output device 912, the storage device 913, the drive 914, the connection port 915, and the communication device 916 via the interface 908.

The input device 911 includes an input device to which information is input such as a touch panel, a keyboard, a mouse, a button, a microphone, a switch, or a lever. The input device 911 also includes an input control circuit that generates an input signal on the basis of input information and outputs the input signal to the CPU 901.

The output device 912 includes a display device such as a CRT display device, a liquid crystal display device, or an organic EL display device. The output device 912 may further include an audio output device such as a speaker or headphones. For example, the output device 912 may execute the function of the notification unit 180.

The storage device 913 storages data of the control device 100. The storage device 913 may include a storage medium, a storage device that stores data in the storage medium, a reading device that reads data from the storage medium, and a deletion device that deletes stored data.

The drive 914 is a reader/writer for storage mediums, and is built in or externally attached to the control device 100. For example, the drive 914 can read out information recorded in a removable storage medium mounted thereto such as a magnetic disk, an optical disk, a magneto-optical disk, or a semiconductor memory, and output the information to the RAM 903. The drive 914 is also capable of writing information to a removable storage medium.

The connection port 915 is a connection interface including a connection port for connecting an external connection device such as a USB port, an Ethernet (registered trademark) port, an IEEE 802.11 standards port, or an optical audio terminal. The communication device 916 is a communication interface including a communication device or the like for coupling with a network 920, for example. Meanwhile, the communication device 916 may be a wired or wireless LAN compatible communication device or a cable communication device that performs wired cable communication. The connection port 915 and the communication device 916 may execute the function of the communication unit 160.

It is also possible to generate a computer program for causing the hardware such as the CPU, the ROM, and the RAM built in the control device 100 to exert functions equivalent to those of the components of the control device 100 according to the present embodiment described above. There is also provided a storage medium storing the computer program.

5. Summary

As described above, according to the control device 100 of the present embodiment, it is possible to execute a task flexibly by cooperation with the other robot 2 even in a case where the ability of the robot 1 alone is insufficient for execution of the task.

According to the control device 100 of the present embodiment, it is also possible to smoothly execute a task by cooperation with an appropriate robot 2 at each time point depending on the capability of the robot 1 that changes dynamically.

The control device 100 according to the present embodiment can be used in the following use cases, for example. Specifically, the control device 100 can be applied to a case where a plurality of robots carries a load in cooperation that is too heavy for the robot 1 alone to carry. In addition, the control device 100 can be applied to a case where another robot assists when an object such as a book is lifted so that the balance of the center of gravity is not lost. In addition, the control device 100 can be applied to a case where another robot having a manipulation ability lifts up furniture or the like in order for a cleaning robot to clean the entire floor surface. Furthermore, the control device 100 can be applied to a case where another robot is caused to output, by sound, a notification from a robot that does not have a speaker or the like to in order to notify a user by sound.

The preferred embodiments of the present disclosure have been described in detail with reference to the accompanying drawings; however, the technical scope of the present disclosure is not limited to such examples. It is clear that a person having ordinary knowledge in the technical field of the present disclosure can conceive various variations or modifications within the scope of the technical idea described in the claims, and it is understood that these variations or modifications also naturally belong to the technical scope of the present disclosure.

In addition, the effects described herein are merely illustrative or exemplary, and not limiting. That is, the technology according to the present disclosure may exert other effects apparent to those skilled in the art from the description of the present specification, together with or in place of the above effects.

Note that the following configurations are also within the technical scope of the present disclosure.

(1)
A control device including:
an ability management unit that determines capability indicating ability that can be executed by a first robot at predetermined timing as of that timing;
a help management unit that compares ability required for a task to be executed by the first robot with the capability of the first robot and generates a help list indicating ability required for execution of the task; and
a cooperation management unit that instructs a second robot having the capability that satisfies the ability indicated in the help list to execute the task in cooperation with the first robot.

(2)
The control device according to the item (1), in which the ability management unit updates the capability at a start and an end of the task.

(3)
The control device according to the item (1) or (2), in which the ability management unit updates the capability at predetermined intervals.

(4)
The control device according to any one of the items (1) to (3), further including a robot management unit that selects a robot that cooperates with the first robot.

(5)
The control device according to the item YU, in which the robot management unit selects the robot that cooperates with the first robot from among at least one or more robots coupled with the first robot through communication or a network.

(6)
The control device according to the item (4) or (5), in which the robot management unit selects the robot that cooperates with the first robot on the basis of similarity or complementarity of the capability between the robot and the first robot.

(7)
The control device according to any one of the items (4) to (6), in which the robot management unit selects the robot that cooperates with the first robot on the basis of an evaluation value of the robot.

(8)
The control device according to the item (7), in which the robot management unit updates the evaluation value of the second robot after completion of the cooperation between the first robot and the second robot.

(9)
The control device according to the item (8), in which the robot management unit lowers the evaluation value of the second robot in a case where the cooperation between the first robot and the second robot is interrupted.

(10)
The control device according to the item (9), in which the cooperation between the first robot and the second robot is interrupted by user intervention in the second robot.

(11)
The control device according to any one of items (4) to (10), in which the help management unit acquires capability of the robot selected by the robot management unit and determines whether or not the capability of the robot satisfies the ability indicated in the help list.

(12)
The control device according to any one of the items (4) to (10), in which the help management unit transmits the help list to the robot selected by the robot management unit and receives a result of determination of availability of cooperation from the robot.

(13)
The control device according to the item (1), in which the help management unit updates the help list on the basis of capability after the change in a case where the capability of the first robot changes.

(14)
The control device according to the item (13), in which the help management unit determines availability of cooperation between the first robot and the second robot can be continued on the basis of the updated help list in a case where the first robot and the second robot are in cooperation.

(15)
The control device according to any one of the items (1) to (14), further including a task management unit that determines ability necessary for execution of the task.

(16)
The control device according to any one of the items (1) to (15), in which the capability further includes information related to a time axis for execution of the ability.

(17)
A control method, by an arithmetic processing device, including:
determining capability indicating ability that can be executed by a first robot at predetermined timing as of that timing;

comparing ability required for a task to be executed by the first robot with the capability of the first robot and generating a help list indicating ability required for execution of the task; and instructing a second robot having the capability that satisfies the ability indicated in the help list to execute the task in cooperation with the first robot.

(18)

A control system including:

an ability management unit that determines capability indicating ability that can be executed by a first robot at predetermined timing as of that timing;

a help management unit that compares ability required for a task to be executed by the first robot with the capability of the first robot and generates a help list indicating ability required for execution of the task; and a cooperation management unit that instructs a second robot having the capability that satisfies the ability indicated in the help list to execute the task in cooperation with the first robot.

REFERENCE SIGNS LIST 1, 2 Robot
11 Help list
12 Reply
100 Control device
110 Task management unit
120 Ability management unit
130 Help management unit
140 Robot management unit
150 Cooperation management unit
160 Communication unit
170 Mechanism control unit
180 Notification unit

The invention claimed is:

1. A control device comprising:
an ability management unit configured to determine dynamic capability indicating ability that can be executed by a first robot at predetermined timing as of that timing;
a help management unit configured to compare ability required for a task to be executed by the first robot with the dynamic capability of the first robot and generate a help list indicating ability required for execution of the task; and
a cooperation management unit configured to instruct a second robot having the dynamic capability that satisfies the ability indicated in the help list to execute the task in cooperation with the first robot,
wherein the dynamic capability changes based on whether there is a failure in the robots or on an amount of electric power remaining in batteries of the robots, and
wherein the ability management unit, the help management unit, and the cooperation management unit are each implemented via at least one processor.

2. The control device according to claim 1, wherein the ability management unit is further configured to update the dynamic capability at a start and an end of the task.

3. The control device according to claim 1, wherein the ability management unit is further configured to update the dynamic capability at predetermined intervals.

4. The control device according to claim 1, further comprising a robot management unit configured to select the second robot that cooperates with the first robot,
wherein the robot management unit is implemented via at least one processor.

5. The control device according to claim 4, wherein the robot management unit is further configured to select the second robot that cooperates with the first robot from among at least one or more robots coupled with the first robot through communication or a network.

6. The control device according to claim 4, wherein the robot management unit is further configured to select the second robot that cooperates with the first robot on a basis of similarity or complementarity of the dynamic capability between the second robot and the first robot.

7. The control device according to claim 4, wherein the robot management unit is further configured to select the second robot that cooperates with the first robot on a basis of an evaluation value of the second robot.

8. The control device according to claim 7, wherein the robot management unit is further configured to update the evaluation value of the second robot after completion of the cooperation between the first robot and the second robot.

9. The control device according to claim 8, wherein the robot management unit is further configured to lower the evaluation value of the second robot in a case where the cooperation between the first robot and the second robot is interrupted.

10. The control device according to claim 9, wherein the cooperation between the first robot and the second robot is interrupted by user intervention in the second robot.

11. The control device according to claim 4, wherein the help management unit is further configured to acquire capability of the second robot selected by the robot management unit and determine whether or not the capability of the second robot satisfies the ability indicated in the help list.

12. The control device according to claim 4, wherein the help management unit is further configured to transmit the help list to the second robot selected by the robot management unit and receive a result of determination of availability of cooperation from the second robot.

13. The control device according to claim 1, wherein the help management unit is further configured to update the help list on a basis of capability after the change in a case where the dynamic capability of the first robot changes.

14. The control device according to claim 13, wherein the help management unit is further configured to determine whether or not the cooperation between the first robot and the second robot can be continued on a basis of the updated help list in a case where the first robot and the second robot are in cooperation.

15. The control device according to claim 1, further comprising a task management unit configured to determine ability necessary for execution of the task,
wherein the task management unit is implemented via at least one processor.

16. The control device according to claim 1, wherein the dynamic capability further includes information related to a time axis for execution of the ability.

17. A control method, by an arithmetic processing device, comprising:
determining dynamic capability indicating ability that can be executed by a first robot at predetermined timing as of that timing;
comparing ability required for a task to be executed by the first robot with the dynamic capability of the first robot and generating a help list indicating ability required for execution of the task; and
instructing a second robot having the dynamic capability that satisfies the ability indicated in the help list to execute the task in cooperation with the first robot, wherein the dynamic capability changes based on whether there is a failure in the robots or on an amount of electric power remaining in batteries of the robots.

18. A control system comprising:
an ability management unit configured to determine dynamic capability indicating ability that can be executed by a first robot at predetermined timing as of that timing;
a help management unit configured to compare ability required for a task to be executed by the first robot with the dynamic capability of the first robot and generate a help list indicating ability required for execution of the task; and
a cooperation management unit configured to instruct a second robot having the dynamic capability that satisfies the ability indicated in the help list to execute the task in cooperation with the first robot,
wherein the dynamic capability changes based on whether there is a failure in the robots or on an amount of electric power remaining in batteries of the robots, and
wherein the ability management unit, the help management unit, and the cooperation management unit is implemented via at least one processor.

19. A non-transitory computer-readable medium having embodied thereon a program, which when executed by a computer causes the computer to execute a control method, the method comprising:
determining dynamic capability indicating ability that can be executed by a first robot at predetermined timing as of that timing;
comparing ability required for a task to be executed by the first robot with the dynamic capability of the first robot and generating a help list indicating ability required for execution of the task; and
instructing a second robot having the dynamic capability that satisfies the ability indicated in the help list to execute the task in cooperation with the first robot,
wherein the dynamic capability changes based on whether there is a failure in the robots or on an amount of electric power remaining in batteries of the robots.

* * * * *